United States Patent [19]
Rivin et al.

[11] Patent Number: 6,003,193
[45] Date of Patent: Dec. 21, 1999

[54] MULTI-FUNCTIONAL APPARATUS HAVING FLEXIBLE CLUTCH

[75] Inventors: Evgeny I. Rivin, West Bloomfield; Victor R. Fey, Southfield, both of Mich.

[73] Assignee: Lear Automotive Dearborn, Inc., Southfield, Mich.

[21] Appl. No.: 08/948,191

[22] Filed: Oct. 9, 1997

[51] Int. Cl.[6] ........................................................ B60S 1/26
[52] U.S. Cl. .................. 15/250.3; 15/250.12; 15/250.31; 74/411; 464/29; 464/57; 464/100
[58] Field of Search ............................. 15/250.3, 250.31, 15/250.16, 250.12; 74/411; 192/56.4, 55.5, 55.3; 464/29, 57, 100, 30, 40, 60, 87

[56] References Cited

U.S. PATENT DOCUMENTS

| | | |
|---|---|---|
| 2,271,207 | 1/1942 | Rhein . |
| 2,345,778 | 4/1944 | Lammeren et al. . |
| 2,595,454 | 5/1952 | Greenlee ................................... 464/30 |

(List continued on next page.)

FOREIGN PATENT DOCUMENTS

| | | |
|---|---|---|
| 144527 | 6/1985 | European Pat. Off. .................. 464/30 |
| 0 345 002 A2 | 6/1989 | European Pat. Off. . |
| 1281424 | 12/1961 | France . |
| 822 178 | 11/1951 | Germany . |
| 28 16 207 A1 | 10/1979 | Germany . |
| 3700678 | 7/1987 | Germany .............................. 15/250.3 |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| 405321943 | 12/1993 | Japan ....................................... 464/40 |
| 553413 | 5/1943 | United Kingdom ..................... 464/57 |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), Sep. 11, 1992 for JP Patent Publication No. 04151351.
P. 100, Machine Design, 60 (1988) Oct. 13, No. 24, Cleveland, Ohio, US.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.
Machine Design, "Basics of Design Engineering", Jun. 1992, Article "Mechanical Systems".
A paper from the Third Conference on Mechanisms, "A Survey of Intermittent–Motion", F.J.Bogardus, 1956, pp. 8–15.

(List continued on next page.)

Primary Examiner—Robert J. Warden, Sr.
Assistant Examiner—Andrew Aldag
Attorney, Agent, or Firm—Harness, Dickey & Pierce, P.L.C.

[57] ABSTRACT

A multi-function apparatus for controlling various functions of a liftgate of an automotive vehicle. The apparatus includes an elastomeric member which is operably disposed in connection with a gear which imparts a driving force to a drive shaft of a window wiper member. The elastomeric member, in one embodiment, is a coiled spring which allows movement between the drive shaft and the gear driving the drive shaft in the event the wiper becomes frozen to the window of the vehicle or otherwise immovable. In this manner various other functions can be carried out by the apparatus regardless if the wiper becomes temporarily immobilized.

16 Claims, 13 Drawing Sheets

U.S. PATENT DOCUMENTS

| | | |
|---|---|---|
| 2,615,945 | 10/1952 | Jaeschke . |
| 2,659,237 | 11/1953 | Wood . |
| 2,722,617 | 11/1955 | Cluwen et al. . |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,450,365 | 6/1969 | Kaplan ........................................ 464/30 |
| 3,516,610 | 6/1970 | Stevens . |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,701,972 | 10/1987 | Saito . |
| 4,702,117 | 10/1987 | Tsutsumi et al. . |
| 4,724,760 | 2/1988 | Bubley . |
| 4,733,147 | 3/1988 | Muller et al. . |
| 4,770,055 | 9/1988 | Chevance et al. ..................... 74/411 |
| 4,774,423 | 9/1988 | Karasawa et al. ................ 15/250.31 |
| 4,793,640 | 12/1988 | Stewart, Sr. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,170,871 | 12/1992 | Batchelder .............................. 192/41 |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,389,040 | 2/1995 | Kakimi ..................................... 464/57 |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,570,923 | 11/1996 | Taylor ..................................... 296/164 |
| 5,691,586 | 11/1997 | Yonnet et al. . |
| 5,694,812 | 12/1997 | Maue et al. . |
| 5,730,028 | 3/1998 | Maue et al. . |
| 5,844,382 | 12/1998 | Dan . |

OTHER PUBLICATIONS

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20 No date available.

"Mechanisms for Engineering Design" "Motion, Circular, Intermittent", Chapter 3, S.B. Tuttle, John Wiley Co., pp. 33–51 No date available.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

Properties and Prospective Applications of Ultra Thin Layered Rubber–Metal Laminates for Limited Travel Bearings, Tribology International, Feb. 1983, E. I. Rivin, pp. 17–25.

MULTI-FUNCTIONAL APPARATUS HAVING FLEXIBLE CLUTCH

BACKGROUND OF THE INVENTION

1. Technical Field

This invention relates to multi-functional apparatuses for controlling various functions or accessories of a motor vehicle, and more specifically to a multi-functional apparatus incorporating a flexible clutch which allows the apparatus to operate in the event one portion of the apparatus, such as a windshield wiper drive shaft, becomes immovable.

2. Discussion

Almost all automotive vehicles in present day use employ some form of window wiper assembly for cleaning the front and/or rear windows of the vehicle. With a rear window wiper assembly, typically a wiper blade is mounted upon a bracket which is coupled to a wiper arm. The wiper arm is attached to a wiper shaft rotatably driven in a cyclical oscillating manner by a helical gear. A reversible, fractional horsepower, direct-current electric motor serves to actuate the helical gear through an armature shaft-mounted worm gear and enmeshed therewith. This type of rear window wiper arrangement is usually mounted upon a pivoting lift gate of a mini-van, station wagon, sport-utility vehicle or the like. One such example is disclosed in U.S. Pat. No. 5,519,258 entitled "System and Method for Controlling Vehicle Lift Gate Window Wiper", which issued to Stroven et al on May 21, 1996, the disclosure of which is hereby incorporated by reference.

It is also common in the automotive industry to employ windshield and rear window wiper systems that have an electric motor and a worm gear. The electric motor constantly reverses direction in order to oscillate a wiper arm and wiper blade back and forth within a wiping range or a path on the window. In other words, the electric motor and worm gear rotate in first respective directions for moving the wiper arm and the blade to one side of the window and then reverse directions for moving the wiper arm and blade to the other side of the window. In some situations, the electric motor and worm gear are further rotated to move the wiper arm on and off of the window to a park position.

Still further, it is known to provide a four-bar linkage to couple a worm gear to a window wiper shaft. In this arrangement, an electric motor and worm gear rotate in a unidirectional manner to facilitate back and forth oscillation of a window wiper arm and blade. In this unidirectional, four-bar linkage construction, a pin always moves concurrently with the worm gear, since the pin is always fixed to the worm gear in a single location. The pin is also coupled to the four-bar linkage.

Typically, various other functions are also performed by the motor and assembly which drives the window wiper arm. Many present day vehicles incorporate a rear window release lock or latch. This lock or latch is actuated by a solenoid and can be unlocked to allow for upward pivotal movement of a rear window in relation to the otherwise stationary lift gate. In combination therewith, a separate lift gate lock is also often mounted upon the lift gate door for fastening the lift gate to the body thereby preventing inadvertent pivotal opening. This lift gate lock is traditionally operated by a manual key or handle rotation, or through a separate electric motor or solenoid.

A potential problem can arise with the above-described arrangements if the wiper arm becomes frozen to the windshield such as because of ice. In this instance, the output shaft of the electric motor, which is operationally coupled to the windshield wiper drive shaft, is prevented from rotating because the windshield wiper drive shaft has become locked up or otherwise immovable. Thus, the various other functions performed by the motor, such as controlling operation of the window release lock or latch or the lift gate lock will not be possible. Accordingly, there is a need for some form of arrangement which allows the windshield wiper drive shaft to be disengaged or "de-clutched" from the output shaft of the drive motor in the event the windshield wiper blade of the vehicle becomes frozen to the vehicle window or temporarily immovable for any other reason.

SUMMARY OF THE INVENTION

The above functions and objects are performed by a multi-functional apparatus incorporating a flexible clutch in accordance with preferred embodiments of the present invention. One preferred embodiment incorporates a coil spring which is disposed within a gear, which is operatively driven by the motor of the apparatus. The spring is also disposed over a drive shaft which is operably associated with a windshield wiper of the motor vehicle. The inside diameter of the coil spring is large than the diameter of the drive shaft such that a definite clearance exists therebetween. The spring is positively coupled to the gear and to the drive shaft and acts as a means for transmitting the driving force imparted by the gear to the drive shaft.

The spring, being flexible, enables the gear to be rotated relative to the drive shaft in the event the wiper of the vehicle becomes frozen to the window of the vehicle or otherwise immobilized temporarily. This is permitted by the clearance between the spring and the driveshaft. The clearance allows the spring to be "wound down" on the drive shaft as the motor rotates, thereby allowing for rotation between the gear and drive shaft. Thus, since the motor output shaft is still allowed to rotate, the various other functions performed by the apparatus are not impeded should the wiper blade become stuck to the window for any reason.

In an alternative embodiment, the spring is disposed within an intermediate wiper spur gear and a drive shaft associated with the wiper spur gear. In an alternative preferred embodiment, permanent magnets are disposed on a wiper gear of the apparatus and on an intermediate wiper spur gear to effect a magnetic coupling therebetween. Should the wiper drive shaft positively coupled to the wiper gear become temporarily immobilized, such as if the wiper freezes to the window of the vehicle, the magnetic coupling between the two gears can be overridden by the motor of the apparatus.

In yet another alternative preferred embodiment one or more cables are used to couple a wiper gear and a wiper spur gear. At least one of the cables is flexible. If a drive shaft coupled to the wiper gear becomes immobilized for any reason, at least a limited degree of rotational movement of the wiper spur gear is possible by a motor of the apparatus through the flexible cable coupling these two gears.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
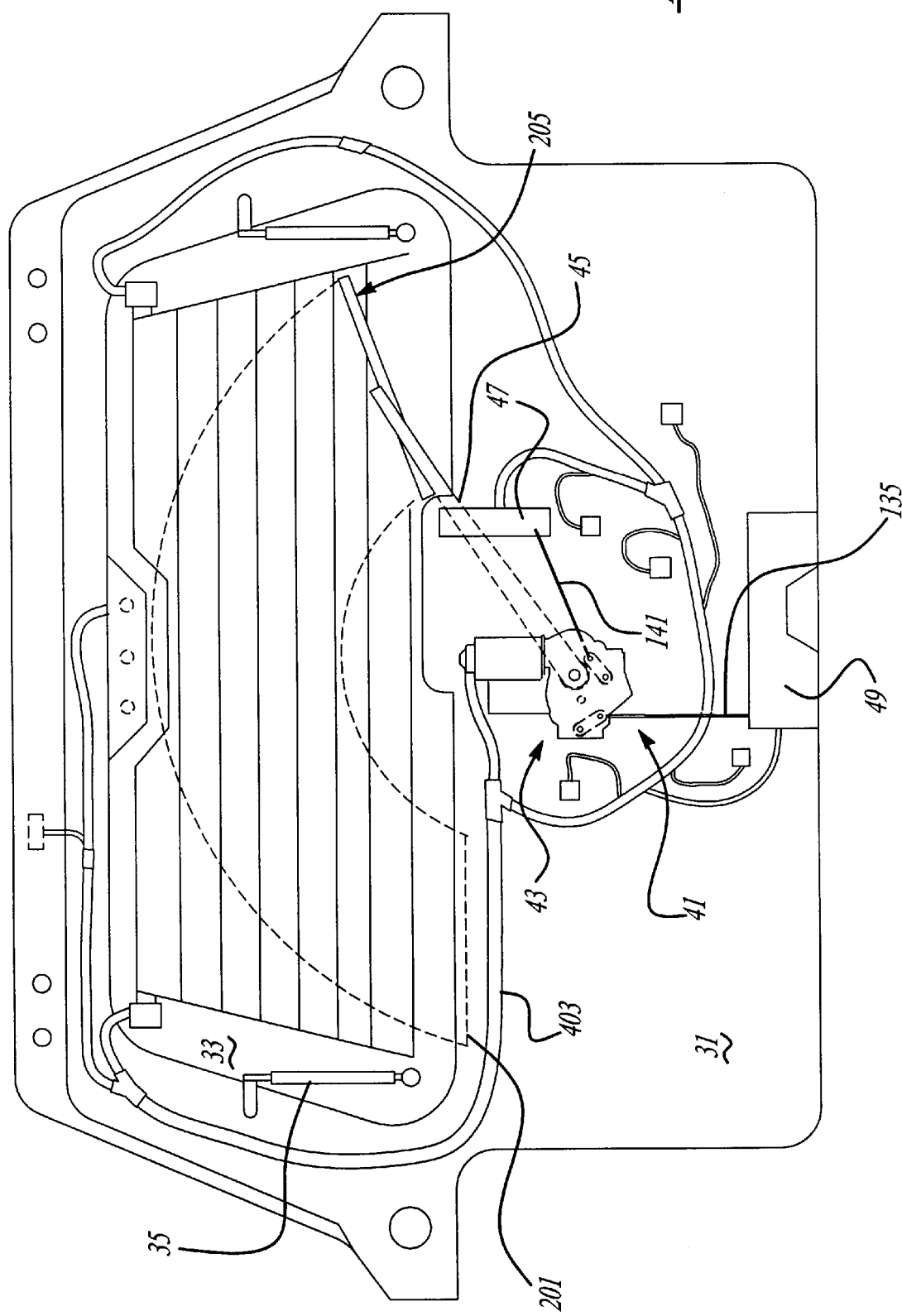
FIG. 1 is a elevational view of a lift gate of a motor vehicle incorporating a multi-functional apparatus in accordance with the present invention.

Referring to FIG. 1, an automotive vehicle, such as a minivan or the like, has a rear liftgate door 31 which can pivot about an upper pair of hinges (not shown) coupled to the vehicle body structure. When the liftgate is pivoted to an open position, a cargo space is accessible from behind the vehicle. The liftgate 31 has a rear window or backlite 33 pivotable between a closed position, substantially flush with the outer surface of liftgate 31, to an open position about spring loaded upper hinges. A pair of pneumatic cylinders 35 act to dampen travel of the window 33 toward the open position when a lower portion of window 33 is released. A preferred embodiment of a multi-functional apparatus 41 of the present invention is mounted upon an inner surface of liftgate 31. The majority of apparatus 41 is hidden by an interior trim panel (not shown). Apparatus 41 includes a central drive and power transmission unit 43, a window wiper assembly 45, a window release latch or lock 47 and a liftgate lock 49, all of which are mounted upon liftgate 31. Examples of such locks (employing separate solenoids or motors, which would be removed in order to couple the lock mechanism for use with the present invention) are disclosed within the following U.S. Pat. Nos. 5,222,775 entitled "Power Operated Latch Device for Automotive Back Door" which issued to Kato on Jun. 29, 1993; 4,422,522 entitled "Inertial Lock for Vehicle Door Latch" which issued to Slavin et al. on Dec. 27, 1983; and, 3,917,330 entitled "Electric Lock Release" which issued to Quantz on Nov. 4, 1975; all of which are incorporated by reference herewithin.

Figure 2:
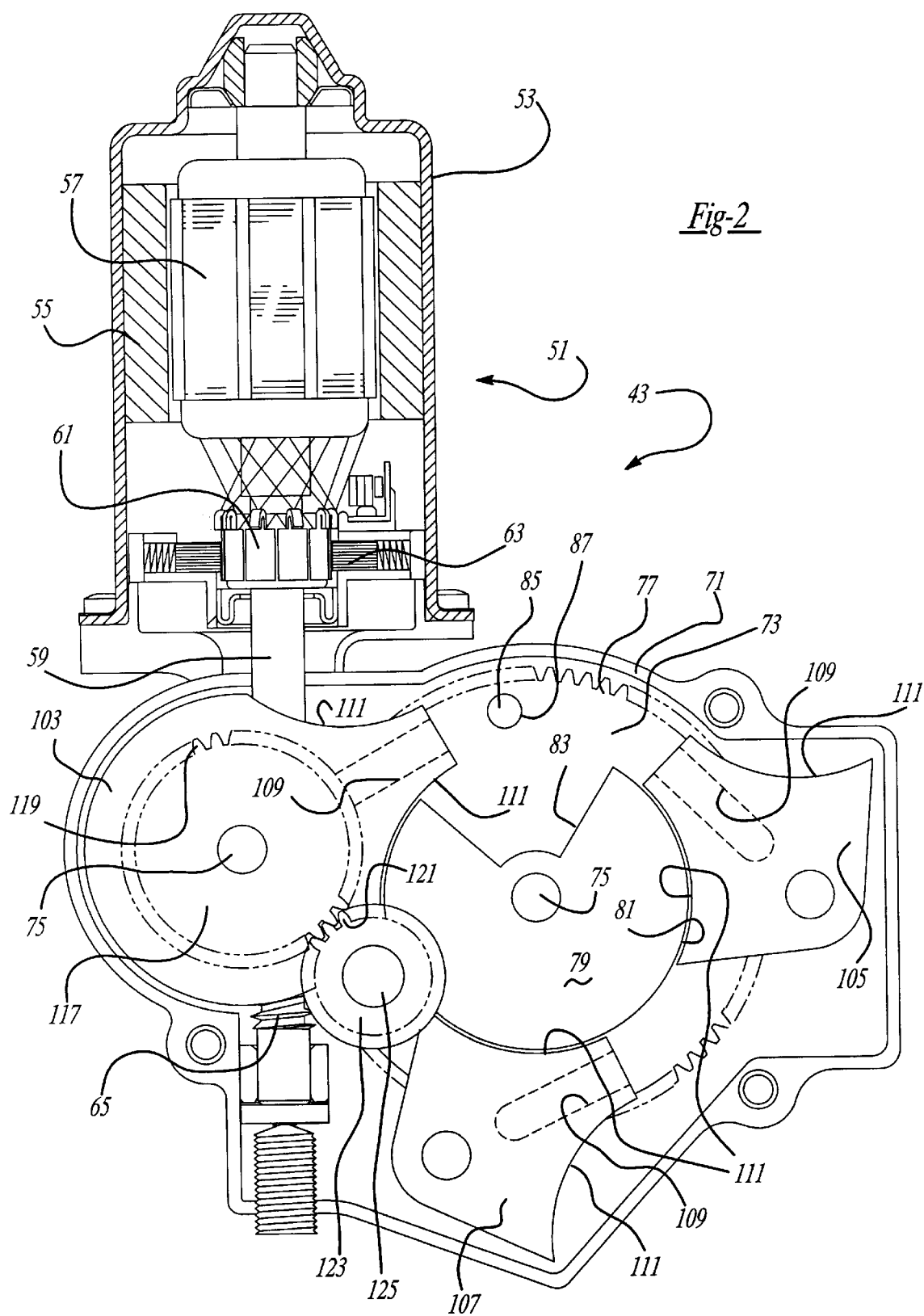
FIG. 2 is a rear elevational view, with portions broken away therefrom, showing one preferred embodiment of the multi-functional apparatus of the present invention.
Figure 3:
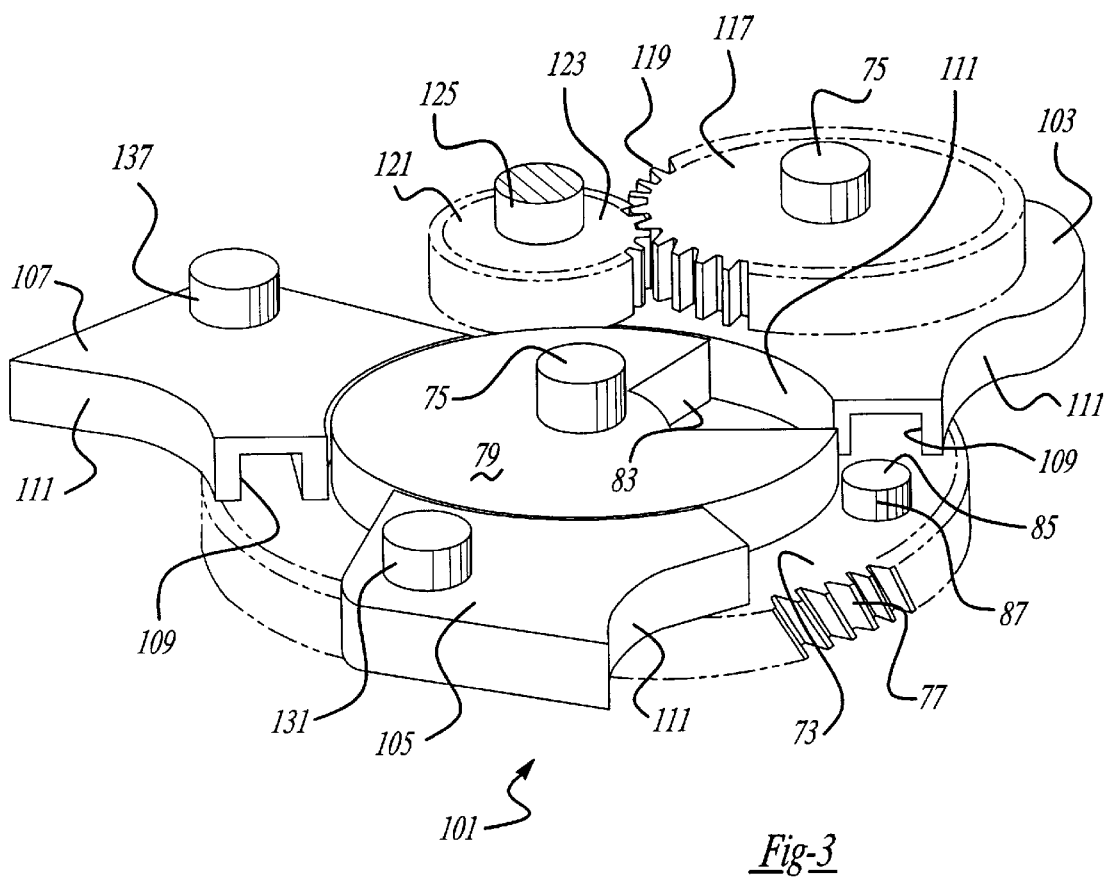
FIG. 3 is a perspective view showing a power transmission assembly employed in the preferred embodiment of the present invention multi-functional apparatus.
Figure 4:
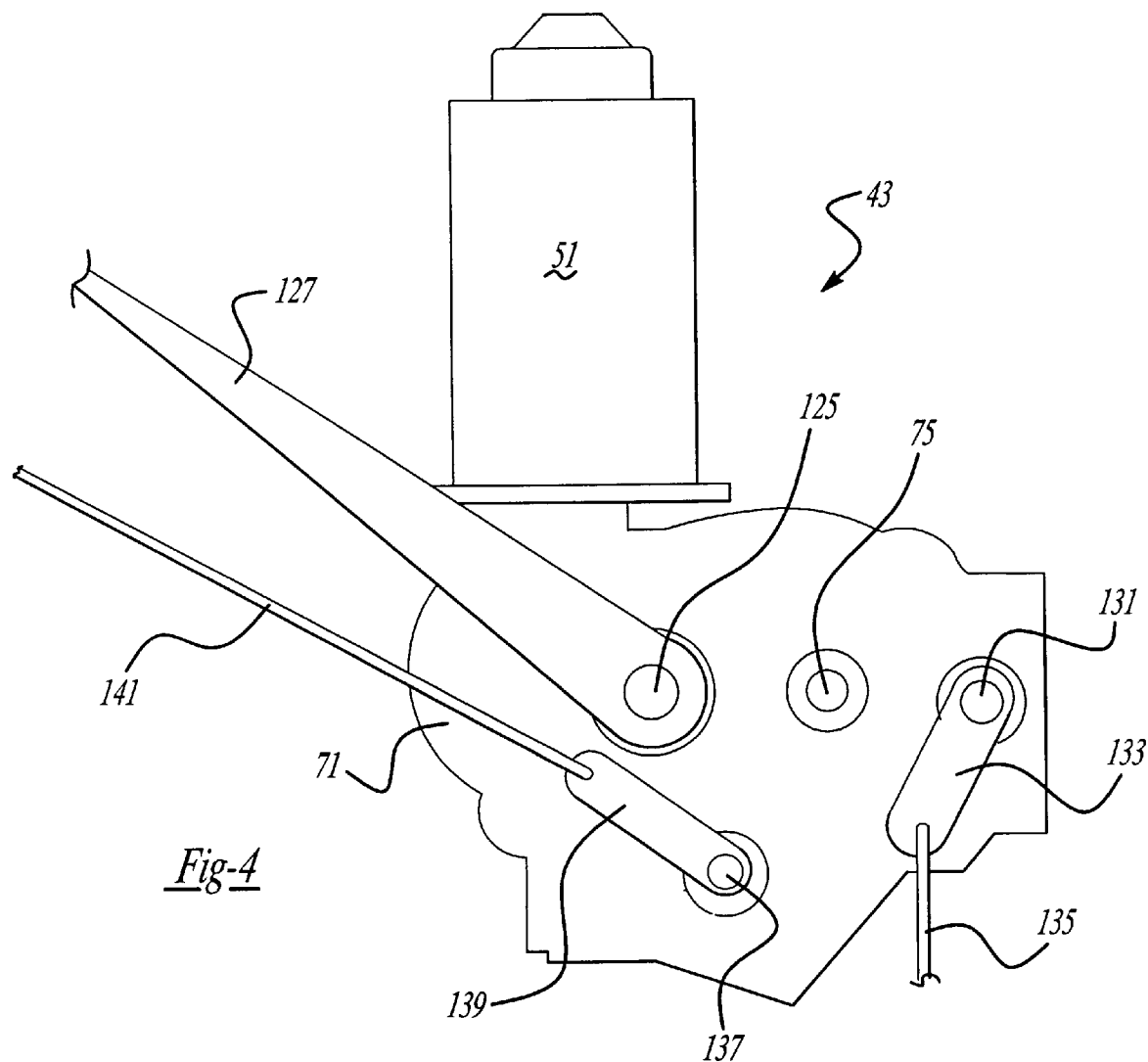
FIG. 4 is a fragmentary rear elevational view of the multi-functional apparatus of the present invention.

The construction of central drive and power transmission unit 43 is best illustrated in FIGS. 2–4. An electric motor 51 is a conventional 12 volt, fractional horsepower, dc electromagnetic motor having a metallic motor housing 53. Within the housing 53 are stationary permanent magnets 55, a rotatable armature 57 with wire windings, a rotatable armature shaft 59 joined to armature 57, a commutator 61 electrically connected to the wire windings and rotatable with armature shaft 59, a brush card assembly 63 and various electronic components, bushings and retainers. It will be appreciated to those skilled in the art that other electric motor constructions can readily be substituted for that shown. A worm gear segment 65 is provided upon a portion of armature shaft 59 extending beyond motor housing 53.

A gear housing 71 is also provided for receiving worm gear segment 65 and the immediately adjacent portions of armature shaft 59. A main helical gear 73 is housed and rotatably journalled within gear housing 71. Gear housing 71 is preferably made from cast aluminum. A plurality of knurled steel journalling pins 75 are press fit or otherwise attached within machined openings of gear housing 71. The placement of these openings in relation to each other is important. Pins 75 can alternately be molded as part of plastic gears and cams.

Helical gear 73 has an external set of helically oriented teeth 77 projecting entirely therearound for meshing with worm gear segment 65. A drum 79 is mounted upon a face of helical gear 73 for rotating therewith. Drum 79 has a partially circular peripheral surface 81 interrupted by a clearance indentation 83. Drum 79 and helical gear 73 are coaxially aligned for rotation with journalling pin 75. A drive pin 85 projects from a face of helical gear 73 substantially parallel to the adjacent journalling pin 75. Drive pin 85 has a cylindrical driving interface surface 87 thereabout. Of course, a rotatable sleeve may alternately surround drive pin 85. Other alternate driving interface means may be employed such as an integrally molded finger, screw, rivet, spring, rib, plural projections or other similar formations protruding from a face of peripheral portion of helical gear 73. Helical gear 73 is preferably injection molded from a polymeric material such as acetyl. An electrically conductive feedback disk 89 (see FIG. 12) is retained to an inside face of helical gear 73 through ultrasonically rolled welding or insert molding. Feedback disk 89 is comprised of a set of copper alloy or brass alloy stamped contacts which are provided with differing conductive and nonconductive patterns depending on the specific positional ranges as will be discussed in greater detail hereinafter.

A power transmission assembly 101 of central drive and power transmission unit 43 employs three intermittent rotary motion mechanisms or cams 103, 105 and 107. Each cam has a single, linear, external open channel 109 defined by driven interfacing surfaces or walls therein. Driving interface surface 87 of drive pin 85 is selectively engageable against the walls defining channels 109 of each cam. Each cam is rotatable about its respective journalling pin 75. Furthermore, partially circular external surfaces 111 of each cam register with the partially circular peripheral surface 81 of drum 79. A relatively tight tolerance on these registering surfaces of about 1–2 thousandths of an inch is preferably used. Thus, unless each cam is aligned with indentation 83 of drum 79, partially circular peripheral surface 81 of drum 79 will act to prevent rotation of each cam. However, when indentation 83 of drum 79 aligns with an individual cam, concurrently with drive pin 85 engaging within a channel 109 of the same cam, continued rotation of helical gear 73 will cause the selectively coupled cam to rotate therewith. Moreover, the selectively coupled cam will have increased rotational acceleration as drive pin 85 moves closer to journalling pin 75 within channel 109. This rotational acceleration, then deceleration, achieves a desirable inertial ramping up and ramping down effect such that potentially harmful inertial stresses and cyclical fatigue within the device coupled thereto are avoided. The diameter of drive pin 85 should match the width of channel 109 within preferably about half a thousandth of an inch.

Cam 103 additionally has a spur gear 117 stacked coaxially thereupon for simultaneous movement therewith. Spur gear 117 has a peripheral set of teeth 119 extending entirely therearound for enmeshing with a mating external set of teeth 121 extending entirely around a driven pinion gear 123. Pinion gear 123 rotates the output shaft. The window wiper shaft 125 extends from a rear face of pinion gear 123 for moving in concert therewith. Wiper shaft 125 is attached to pinion gear 123 through rivets, insert molding, knurled press fitting, et cetera. A window wiper arm 127 of wiper assembly 45 is mounted upon wiper shaft 125 in a conventional manner. Wiper shaft 125 is preferably made from cold rolled steel. The system is designed to oscillate wiper assembly 45 at forty-five cycles per minute (round trip) but other cycle frequencies can be achieved.

A protuberance 131 projects from a rear face of cam 105 and engages with a lever 133 which, in turn, is attached to a liftgate lock rod 135. Protuberance 131, lever 133 and rod 135 are also considered to be lock couplings or coupling members. Lock connecting rod 135 is joined to liftgate lock 49 (see FIG. 1) for causing the mechanisms therein to move in response to movement of cam 105. Similarly, a protuberance 137 extends from and moves with a rear face of cam 107. A lever 139 is connected to protuberance 137 for moving therewith. A liftgate window release lock connecting rod 141 connects lever 139 to liftgate window release lock 47 (see FIG. 1) for causing window releasing movement thereof in response to selective movement of cam 107. Protuberance 137, lever 139 and connecting rod 141 are also defined as liftgate window release lock couplings or coupling members. Protuberances 131 and 137 are preferably secured to their respective levers 133 and 139 in a keyhole manner. Additional threaded nuts, push nuts, crimpings, cotter pins and washers or the like (not shown) may be employed to retain the levers to their protrusions. The cams, spur gear and pinion gear are preferably made from powdered metallic steel. Alternately, other coupling means may be employed such as cables, belts, chains, gear sets, multiple linkages, jack screws, rack and pinion gear sets or the like.

Figure 5:
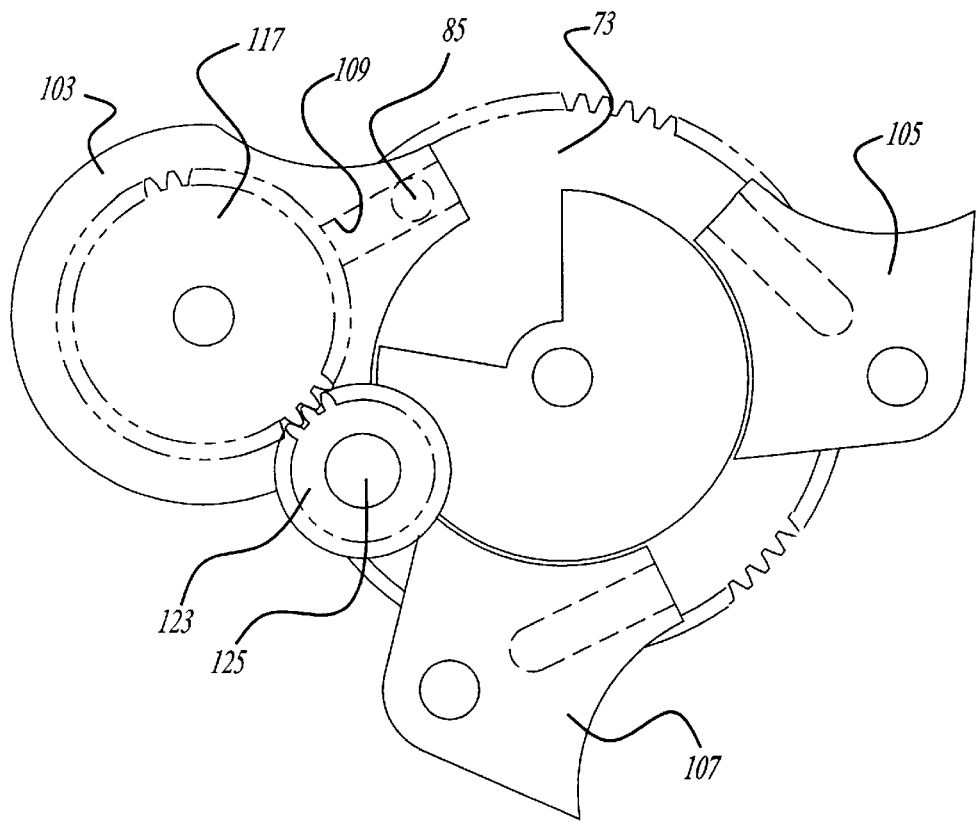
FIG. 5 is a diagrammatic rear view showing the power transmission assembly mechanisms of the preferred embodiment multi-functional apparatus of the present invention in the beginning of a wipe position.
Figure 6:
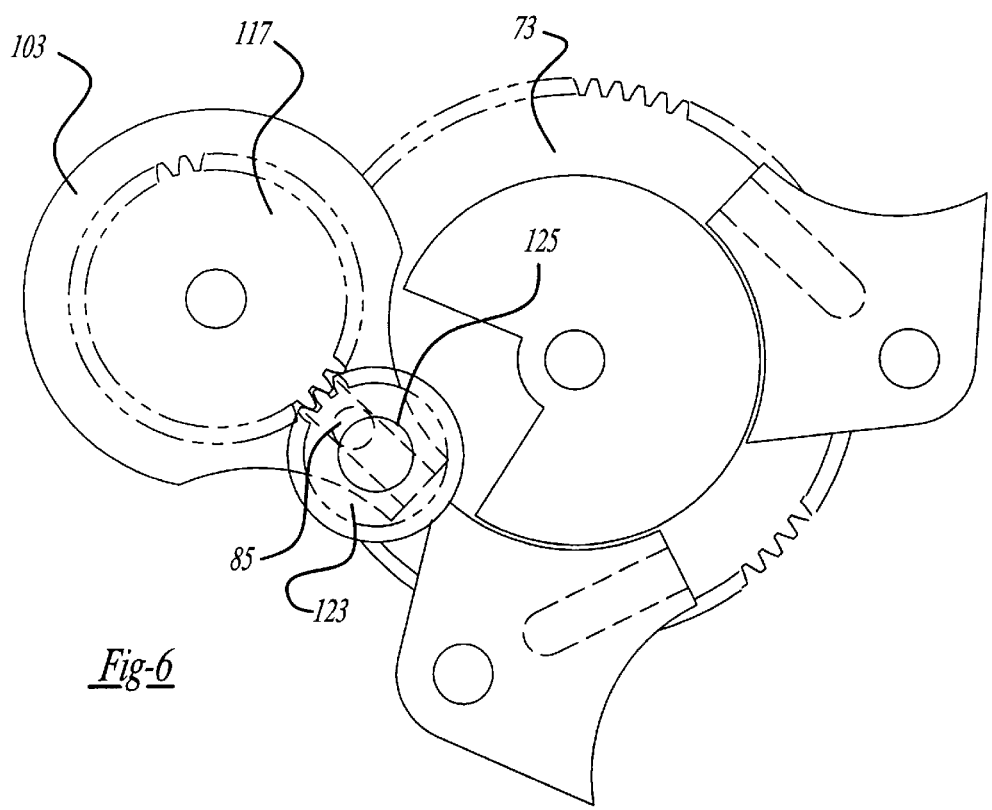
FIG. 6 is a diagrammatic rear view showing the power transmission assembly of the preferred embodiment multi-functional apparatus of the present invention at the end of one direction of a wiping motion.
Figure 7:
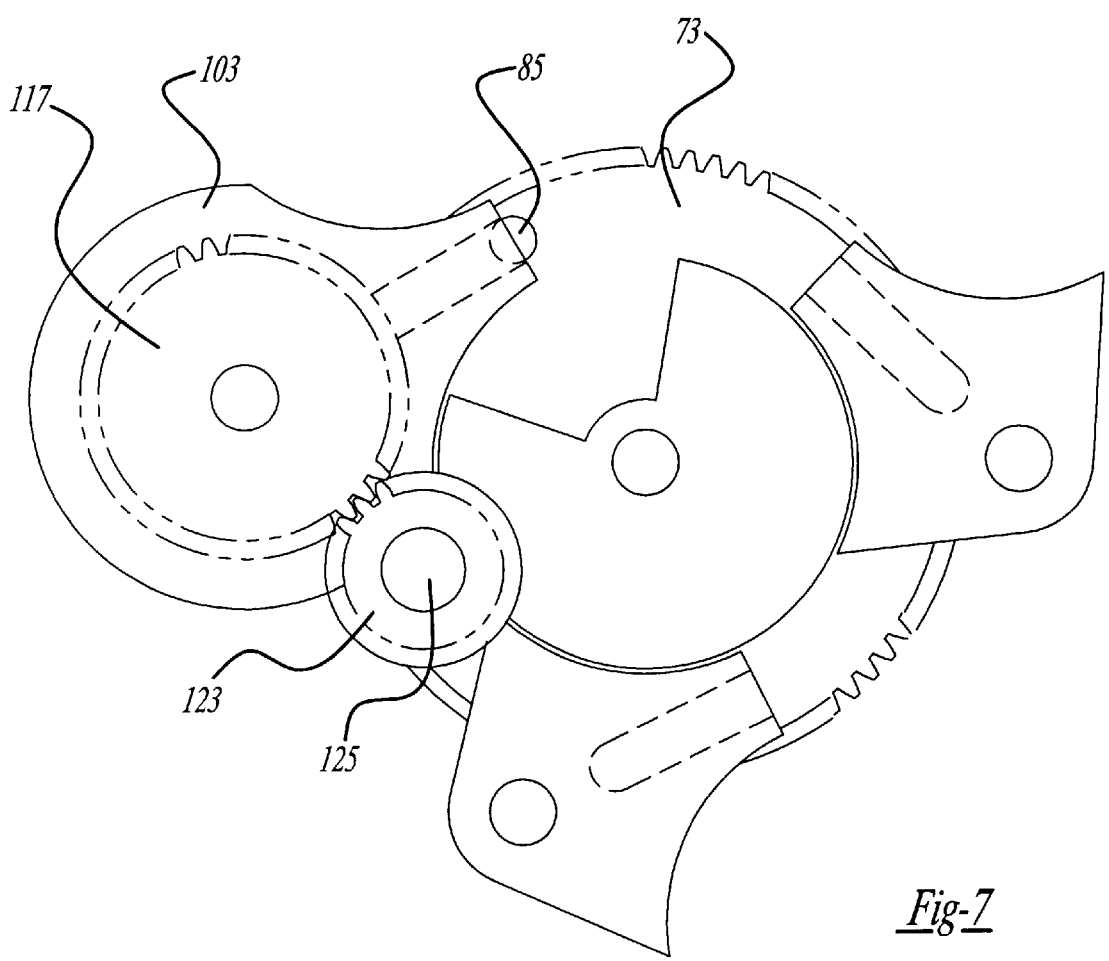
FIG. 7 is a diagrammatic rear view showing the power transmission assembly of the preferred embodiment multi-functional apparatus of the present invention at the end of the depressed park position.

The operation of the multi-functional apparatus of the present invention can best be understood by referring to FIGS. 5–12. In FIG. 5, drive pin 85 has partially entered channel 109 of cam 103. In this position, the wiper blade is moved 6° from a depressed park position 201 (see FIGS. 1 and 12) to the beginning of the window wipe range designated as position 203 (see FIG. 12). FIG. 6 shows helical gear 73, drive pin 85, cam 103, spur gear 117 and pinion gear 123 rotated 162° to the completion position 205 (see FIGS. 1 and 12) at the end of the window wipe range. The electrical polarity is then reversed to motor 51 (see FIG. 2) such that rotation of helical gear 73, drive pin 85, cam 103, spur gear 117, pinion gear 123 and wiper shaft 125 are reversed back to helical gear position 203 (see FIG. 12). Referring to FIG. 7, helical gear 73 is rotated such that drive pin 85 moves cam 103, spur gear 117, pinion gear 123, wiper shaft 125 and wiper assembly 45 to the depressed wiper arm parking position 201 (see FIGS. 1 and 12). The wiper blade is thus moved off of the rear liftgate window 33 (FIG. 1) such that the wiper blade is supported on a bracket upon the liftgate door 31 (FIG. 1). This allows for free movement of the lift glass window 33 as will be discussed hereinafter.

Figure 8:
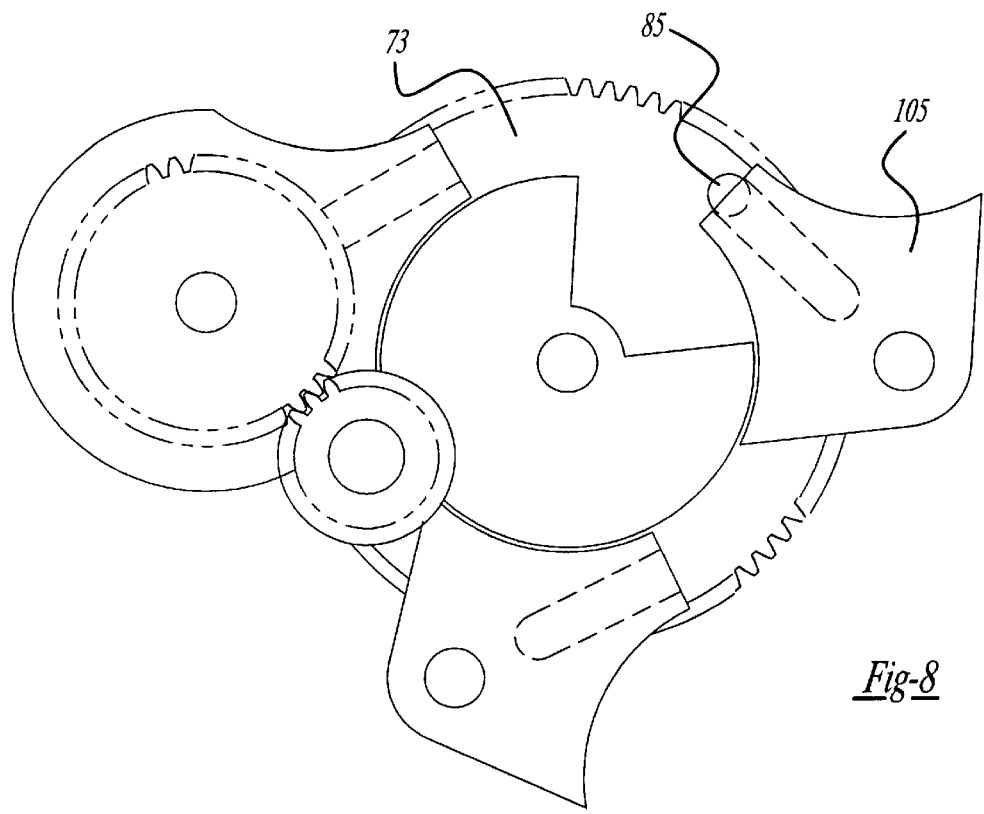
FIG. 8 is a diagrammatic rear view showing the power transmission assembly of the preferred embodiment multi-functional apparatus of the present invention at the beginning of a liftgate unlocking motion.
Figure 9:
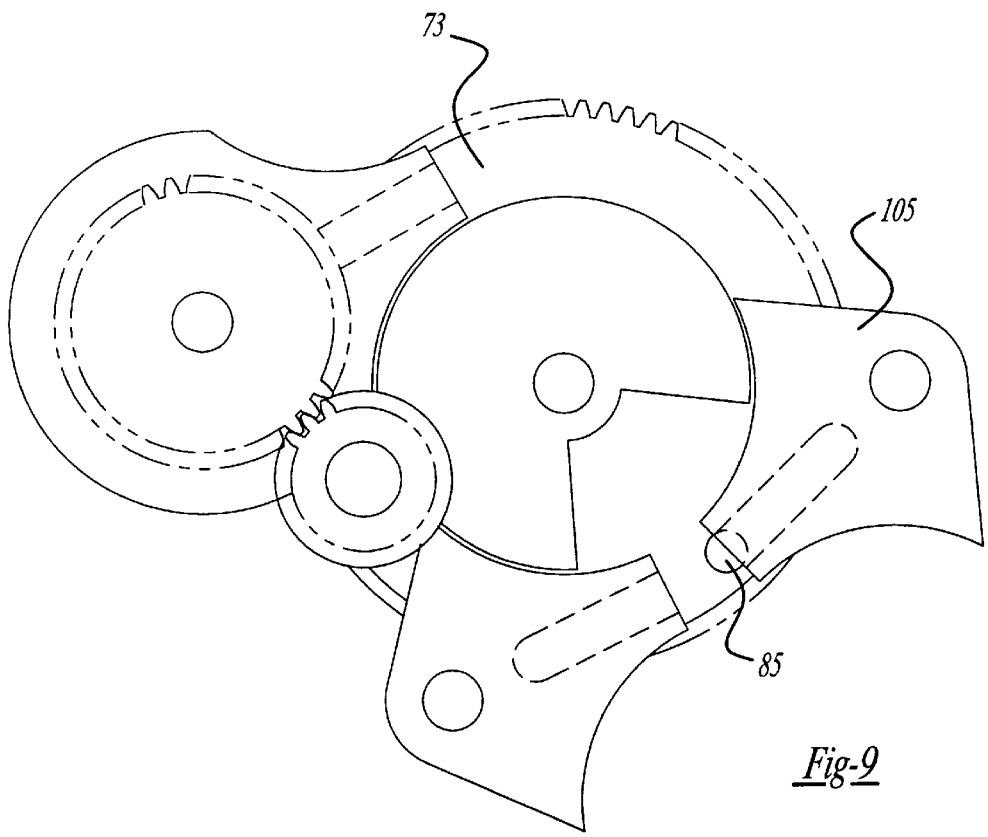
FIG. 9 is a diagrammatic rear view showing the power transmission assembly of the preferred embodiment multi-functional apparatus of the present invention at the completion of the liftgate unlocking motion.
Figure 12:
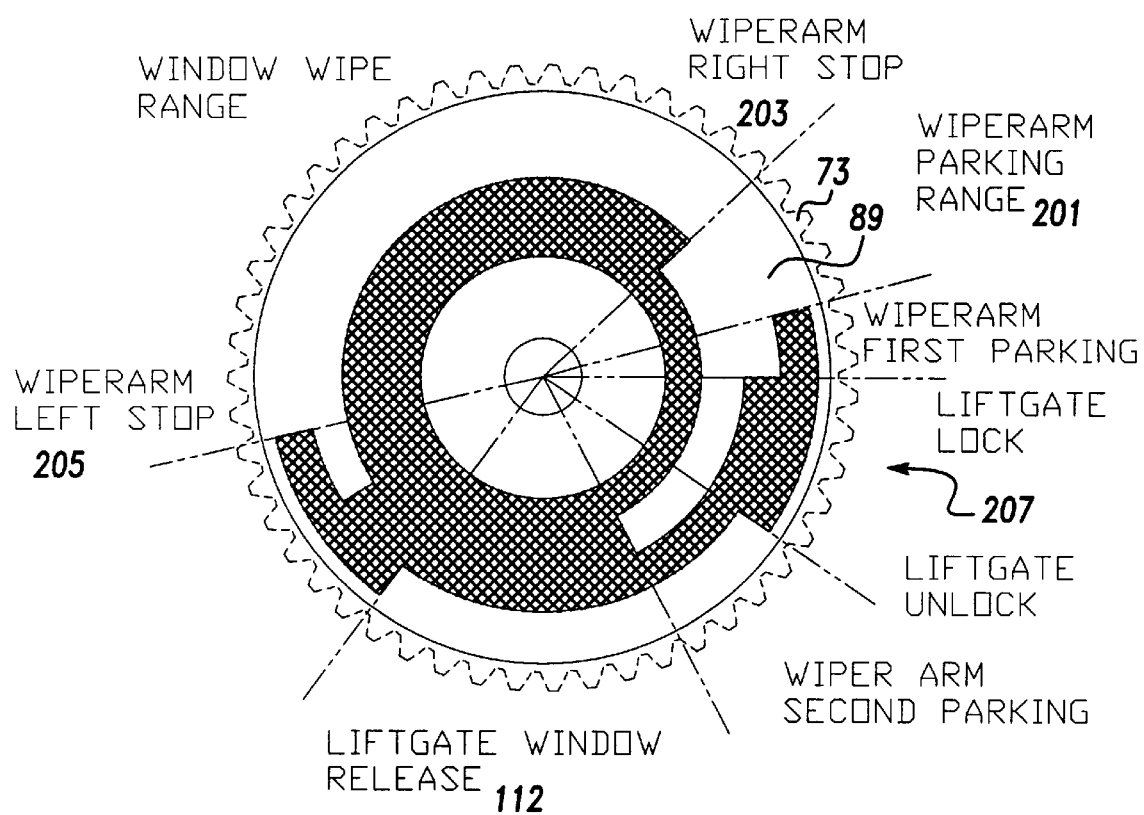
FIG. 12 is a diagrammatic front view showing a motor feedback circuit disk employed in the preferred embodiment multi-functional apparatus of the present invention.

FIG. 8 illustrates helical gear 73 and drive pin 85 moved to the beginning of a liftgate lock/unlock positional range 207 (see FIG. 12). Subsequently, FIG. 9 shows helical gear 73 and drive pin 85 rotated to the completion of the liftgate lock/unlock positional range 207. Clockwise movement (as illustrated) of helical gear 73 through range 207 causes cam 105 to move to an unlocked orientation thereby causing the couplings and liftgate lock 49 (see FIG. 1) associated therewith to also be moved from a locked orientation to an unlocked orientation. Motor 51 (see FIG. 2) can then be reversed to move helical gear 73 in a counterclockwise direction (as illustrated); this causes drive pin 85, cam 105, the couplings and liftgate lock 49 (see FIG. 1) to move from an unlocked orientation to a locked orientation.

Figure 10:
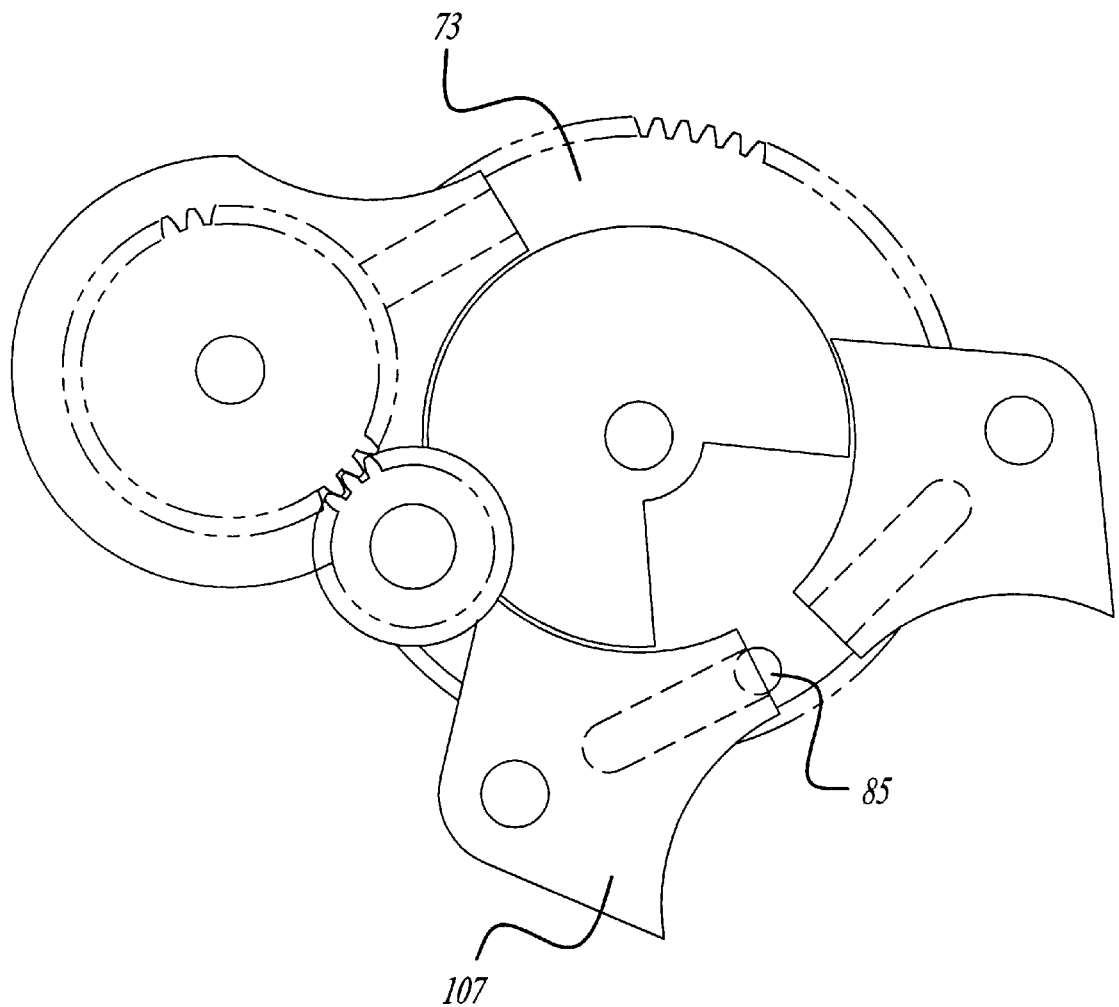
FIG. 10 is a diagrammatic rear view showing the power transmission assembly of the preferred embodiment multi-functional apparatus of the present invention at the beginning of a liftglass unlocking and release motion.
Figure 11:
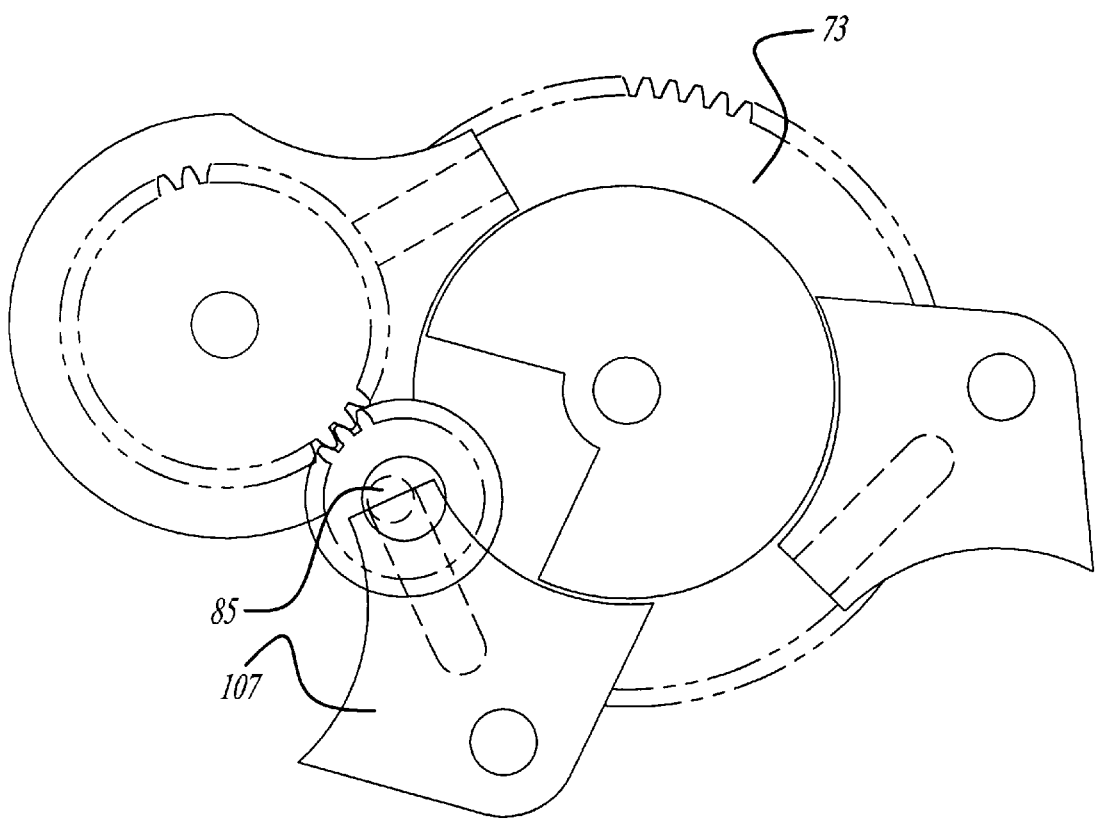
FIG. 11 is a diagrammatic rear view showing the power transmission assembly of the preferred embodiment multi-functional apparatus of the present invention at the completion of the liftglass unlocking and release motion.

In FIG. 10, helical gear 73 and drive pin 85 are shown rotated to the beginning of a liftgate window release positional range 112 (see FIG. 12). In this position, drive pin 85 engages cam 107. Helical gear 73, drive pin 85 and cam 107 are then rotated to the completion of the liftgate window release range 211 (see FIG. 12) as is shown in FIG. 11. This causes the couplings and window release lock 47 (see FIG. 1) to move from a locked orientation to an unlocked orientation. After a pause, motor 51 (see FIG. 2) is automatically reversed. Of course, it will be appreciated that the previously discussed positional ranges may have alternate patterns and arrangements, and may include additional or replacement functions.

Although the above-described apparatus 41 has proven to be effective for controlling the various functions associated with the liftgate 31, it will also be appreciated that if the wiper shaft 125 (FIG. 2) becomes immobilized for any reason, such as if a wiper blade operatively coupled thereto becomes frozen to the window 33, that the worm gear 65 of the motor 51 will also become immobilized. This, in turn, will prevent any of the other functions of the apparatus 41 such as operation of the window release latch 47 and the operation of the liftgate lock 49 from being carried out.

Figure 13:
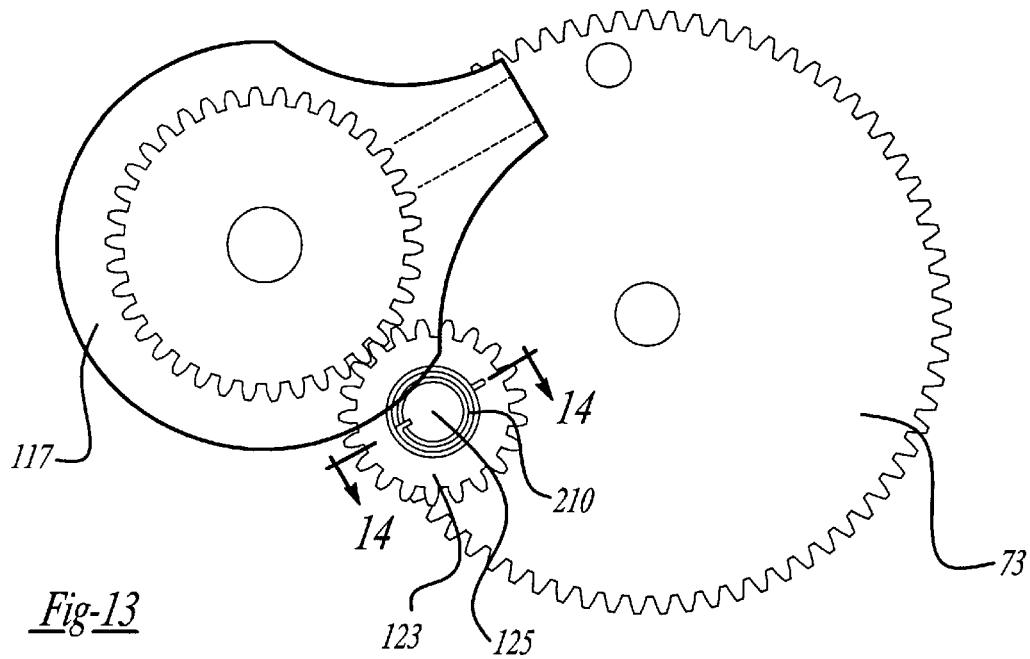
FIG. 13 is a view of the flexible clutch of the present invention incorporated in the Geneva mechanism of FIG. 2.
Figure 14A:
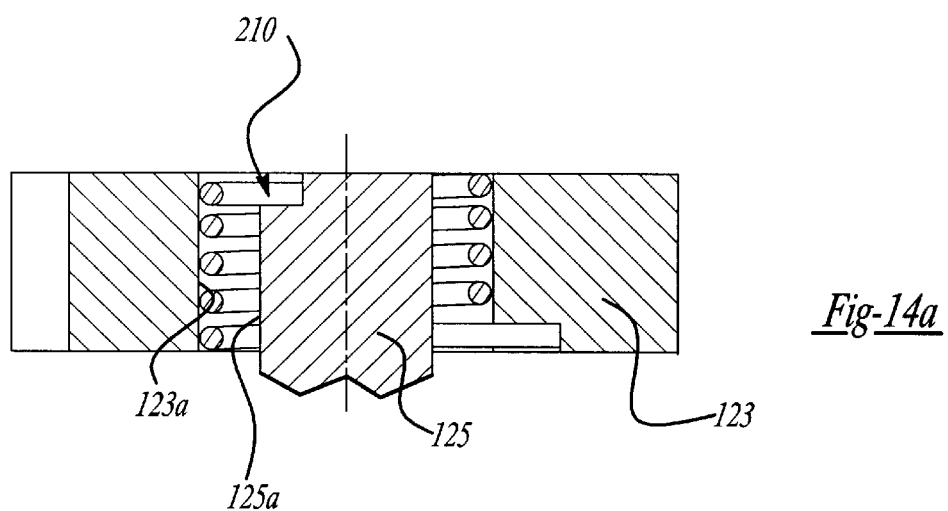
FIG. 14a is a cross sectional view of the wiper gear of FIG. 13 in accordance with section line 14—14 in FIG. 13.

Referring now to FIG. 13, a portion of multi-functional apparatus 41 incorporating a flexible clutch of the present invention is shown. In this preferred embodiment the flexible clutch comprises a spring 210 for allowing the driven wiper gear 123 to rotate independently of the wiper shaft 125. With specific reference to FIGS. 13 and 14a, the spring 123 is in the form of a coil spring and is coupled to a hub 123a of the wiper gear 123 at one end and also to the wiper shaft 125 at its opposite end. The spring is also of dimensions making its inner diameter slightly larger than the outer diameter of the wiper drive shaft 125 such that a clearance exists between the inner surfaces of each winding of the spring 210 and the outer surface 125a of the wiper shaft 125. The outer diameter of the spring 210 is further such that a slight degree of pretensioning or preloading of the spring 210 is required to insert same within the hub 123a of the wiper gear 123.

Figure 14B:
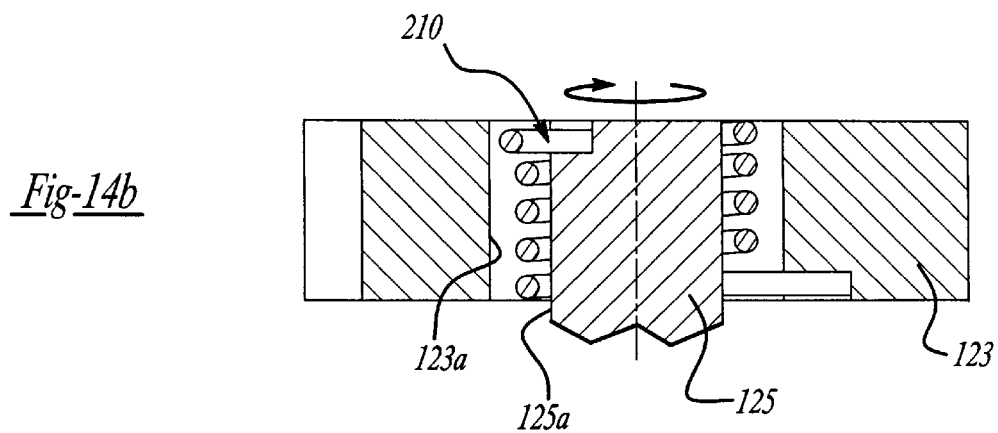
FIG. 14b illustrates the flexible clutch after the wiper gear has been rotated while the wiper drive shaft is immobilized.

During normal operation, that is, when the wiper shaft 125 is able to rotate freely, the spring 210 acts as a means for coupling the wiper gear 123 to the wiper shaft 125 such that the rotational force of the wiper gear 123 can be imparted to the wiper shaft 125. However, if the wiper shaft 125 becomes immobilized for any reason, such as if a wiper blade attached to the wiper shaft 125 becomes frozen because of ice buildup on a window of the vehicle, then further rotation of the wiper gear 123 causes a further torsion loading on the spring 210, which causes the spring 210 to decrease in diameter to the point where it contacts the outer surface 125a of the wiper shaft 125, as shown in FIG. 14b. Thus, the flexibility of the spring 210 and the clearance between the inner diameter of each coil of the spring 210 and the outer surface 125a of the wiper shaft 125 allow the wiper gear 123 to be rotated even if the wiper shaft 125 is immobilized for any reason. This in turn permits the worm gear 65 (FIG. 2) to be driven in both rotational directions by the motor 51 to perform the various other functions capable of being performed by the apparatus 41, such as controlling operation of the liftgate window release and the lift gate lock. Were it not for the degree of movement of the wiper gear 123 allowed by the spring to 210, once the wiper shaft 125 became immobilized no further motion of the worm gear 65, spur gear 117, cam 107, cam 105 or helical gear 73 would be possible.

Figure 15:
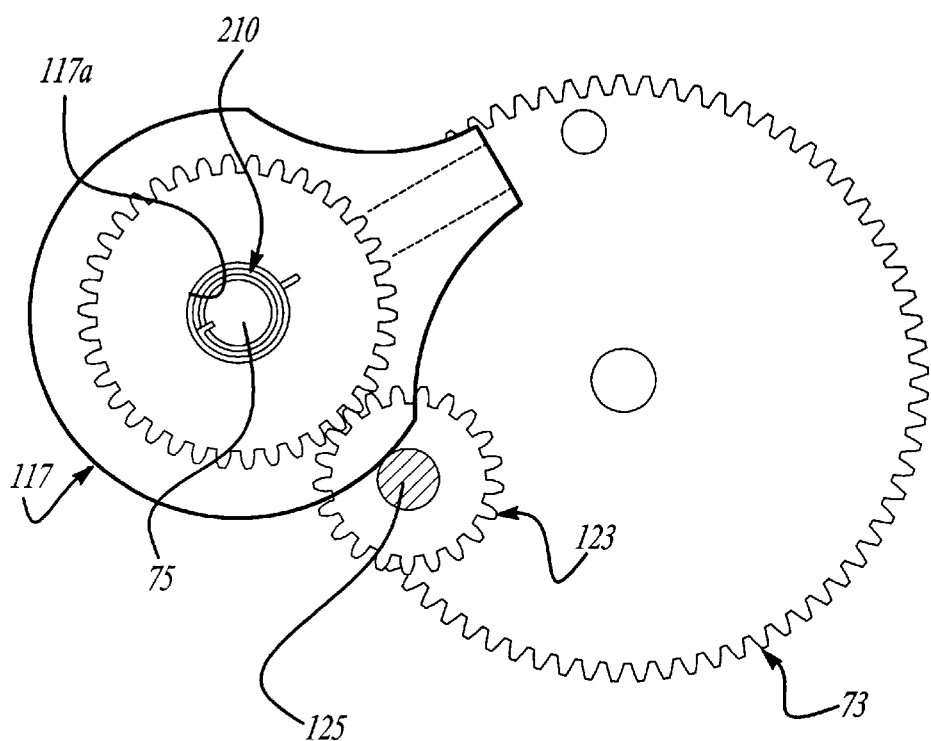
FIG. 15 illustrates the flexible clutch of FIG. 13 disposed within the hub of the spur gear rather than the wiper gear.

While the spring 210 has been disclosed as being coupled within the wiper gear 123, it will be appreciated that spring 210 could also be disposed within the hubs of various other gears and members of the apparatus 41 to accomplish the same function (i.e., allowing operation of the various other components of the apparatus 41 if the wiper shaft 125 is stuck). Referring briefly to FIG. 15, the spring 210 is illustrated disposed within a hub 117a of spur gear 117. If the wiper shaft becomes stuck, thereby preventing rotation of the wiper gear 123, spur gear 17 can still be rotated because of the flexible coupling to journaling pin 75. Thus, worm gear 65 (FIG. 2) will still be able to rotate helical gear 73 even when wiper shaft 125 is immobilized, thus permitting the various other functions of the apparatus 41 to be performed.

Figure 16:
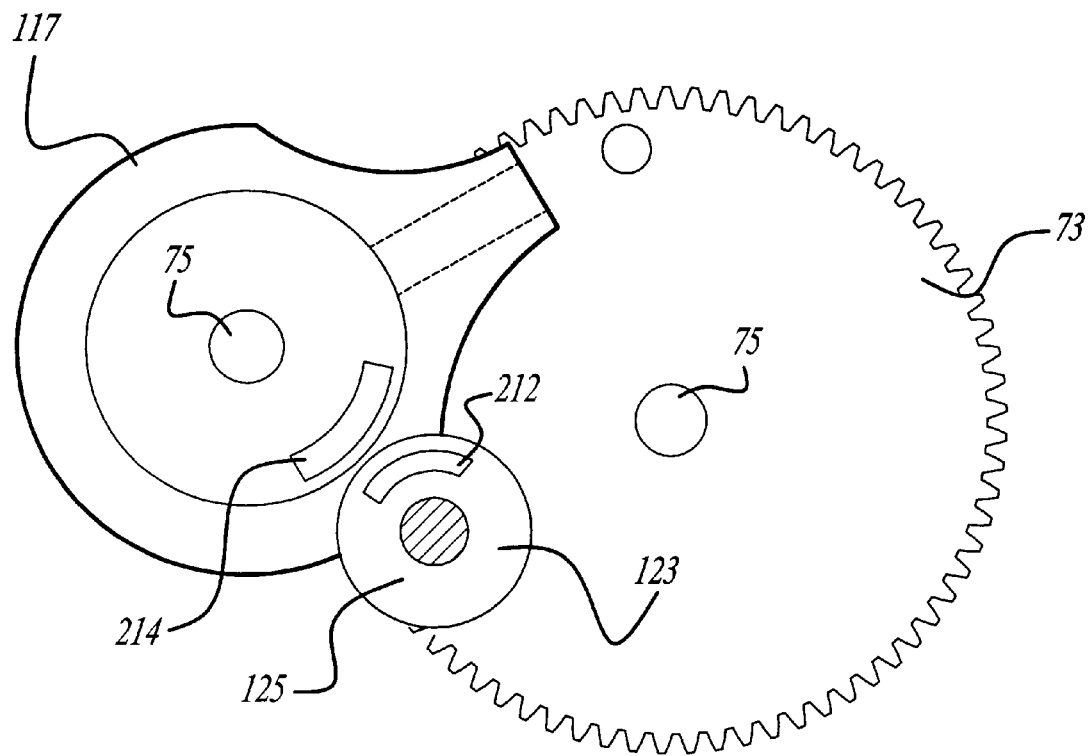
FIG. 16 illustrates an alternative preferred embodiment of the present invention incorporating a pair of permanent magnets for releasably coupling the spur gear and wiper gear.

Referring now to FIG. 16, yet another alternative embodiment of the apparatus 41 is illustrated. The embodiment of FIG. 16 incorporates permanent magnets 212 and 214 secured to areas of the spur gear 117 and the wiper gear 123 as a means for releasably coupling the wiper gear 123 to the spur gear 117. If the wiper gear 123 becomes immovable, the magnetic attractive force between the magnets 212 and 214 can be overcome by the worm gear 65 (FIG. 2) to continue operating the other subassemblies of the apparatus 41.

Figure 17:
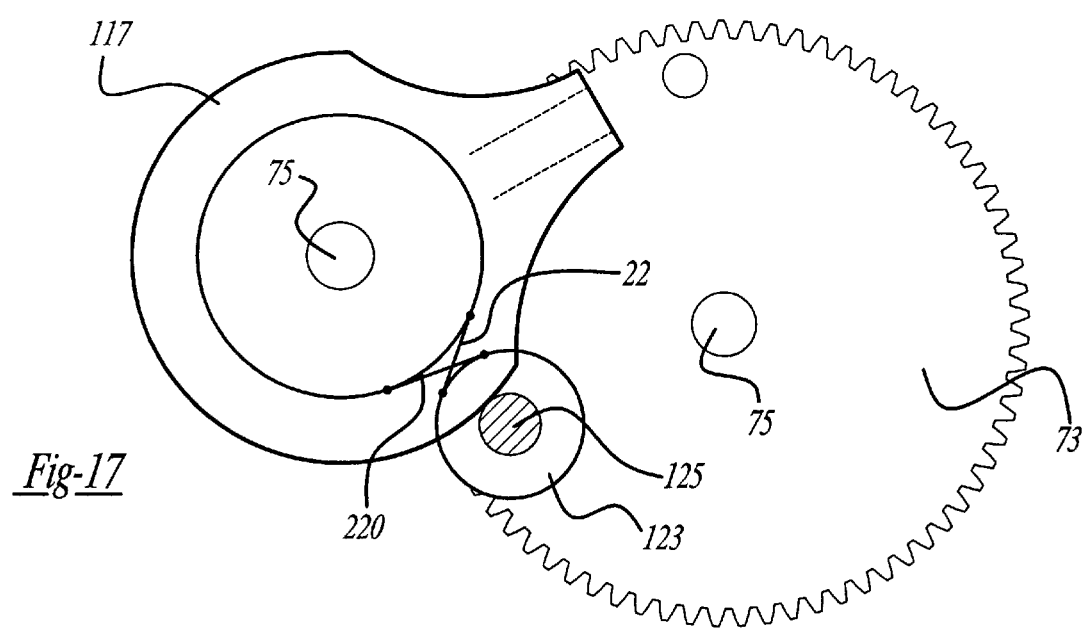
FIG. 17 illustrates another alternative embodiment of the present invention incorporating a pair of cables coupled between the spur gear and the wiper gear.

Referring to FIG. 17, there is shown another alternative preferred embodiment of the flexible coupling member of the apparatus 41. In this embodiment the flexible coupling takes the form of a rigid cable 220 and a flexible cable or spring-like member 222. Cable 220 and flexible cable 220 are each coupled at both ends to the spur gear 117 and the wiper gear 123. When the wiper shaft 125 is free to move, the driving force imparted by rotational movement of the spur gear 117 is transmitted via the rigid cable 220 to the wiper gear 123. If the wiper shaft 125 becomes immovable, flexible cable 222 is able to stretch to permit a degree of movement to permit movement of the spur gear 117.

It will also be appreciated that the various embodiments of the flexible clutch described herein could just as easily be used with a wiper gear of a four-bar mechanism.

Figure 18:
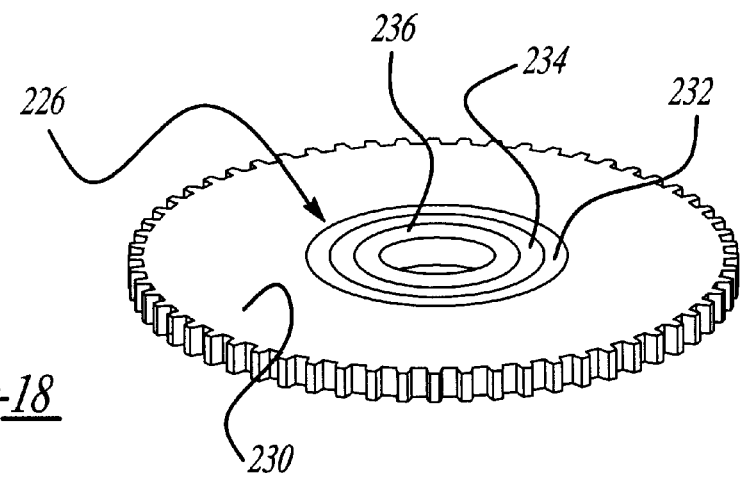
FIG. 18 illustrates another alternative embodiment of the present invention in the form of a rubber-metal laminate bearing/bushing disposed within a hub of a gear.

Referring now to FIG. 18, a metal-rubber laminate bushing 226 is disclosed for eliminating back lash between a shaft which couples member 230 to an external member. Member 230 may be a gear, lever, or any other form of member. The metal-rubber laminate bearing 226 is comprised of a rubber portion 232, a metal portion 234 and another rubber portion 236. In practice, many alternating layers of rubber and metal will be employed. The metal/rubber laminate bushing serves as a form of "solid state" bearing having very high compression stiffness. Such high compression stiffness serves to prevent transverse movement of the shaft supporting member 230 while still allowing for a limited degree of rotational movement of the member 230 in the event the shaft supporting the member 230 becomes immobilized. allowing for its rotation. The properties of metal-rubber laminates are discussed in "Properties and Prospective Applications of Ultra Thin Layered Rubber-Metal Laminates for Limited Travel Bearings", E. I. Rivin, Tribology International, February 1983, the disclosure of which is hereby incorporated by reference.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A multi-function control apparatus for a motor vehicle, said apparatus comprising:

a motor having an output shaft;

a gear operably associated with said output shaft so as to be driven by said output shaft, said gear having a hub with a first diameter;

a drive shaft having an axis of rotation and being disposed concentrically within said hub of said gear and having a second diameter sufficiently smaller than said first diameter to provide a clearance between said drive shaft and an inside surface of said hub;

a wiper device operably driven by rotation of said drive shaft;

an elastic member disposed over said drive shaft within said hub and having two opposing ends that project from said elastic member in a direction perpendicular to the axis of rotation of said drive shaft, wherein one end secures said elastic member to said hub and the other end secures said elastic member to said drive shaft, said elastic member operating to releasably couple said gear and said drive shaft such that said elastic member transmits a driving force from said gear to said drive shaft to drive said drive shaft rotationally; and a second device operably driven by movement of said output shaft, said wiper device being substantially stationary when said second device is operably driven;

said elastic member enabling a degree of rotation of said gear relative to said drive shaft in at least one rotational direction if said drive shaft becomes immoveable, wherein said elastic member further allows movement of said second device if said wiper device is immoveable.

2. The apparatus of claim 1, wherein said elastic member comprises a coil spring; and wherein said coil spring is preloaded prior to inserting same within said hub of said gear.

3. The apparatus of claim 1, wherein said elastic member comprises a coil spring having an inner diameter larger than an outer diameter of said drive shaft such that a clearance exists between an outer surface of said drive shaft and said inner diameter of said coil spring; and wherein said coil spring is directly coupled at each opposing end to said gear and said drive shaft.

4. The apparatus of claim 1, further comprising a third device operably moveable by energization of said motor, said third device being moveable independent of said wiper and second devices, said motor being an electric motor.

5. The apparatus of claim 4, wherein said second device is a lock mechanism.

6. The apparatus of claim 5, further comprising:

a first intermittent motion mechanism coupling said second device to said output shaft; and a second intermittent motion mechanism coupling said third device to said output shaft.

7. A multi-function control apparatus for a motor vehicle, said apparatus comprising:

a fractional horsepower electric motor having an output shaft;

a main gear operably associated with said output shaft so as to be operably driven by said output shaft;

a drive shaft;

a second gear for driving said drive shaft, said second gear having a rotational axis and being movable in response to rotation of said output shaft;

a coupling system operably coupling said main gear and said drive shaft, said coupling system having a rotational axis, said coupling system including a flexible member that surrounds the rotational axis of said second gear and has two opposing ends that project from said flexible member in a direction perpendicular to the rotational axis of said second gear, wherein one end secures said flexible member to said second gear and the other end secures said flexible member to said drive shaft, said coupling system permitting said output shaft of said motor to be moved if said drive shaft becomes immobilized.

8. The apparatus of claim 7, wherein:

said second gear is coupled to said main gear, said second gear including a hub having a diameter larger than that of said drive shaft to provide a clearance therebetween; and said flexible member of said coupling system includes a coil spring having said one end and said other end and being disposed within said hub of said second gear, said coil spring is secured at said one end to said hub and at said other end to said drive shaft.

9. The apparatus of claim 7, wherein said coupling system includes an intermittent motion mechanism having a rotational axis offset and parallel to a rotational axis of said main gear.

10. The apparatus of claim 7, wherein said flexible member is a helically wound spring.

11. A multi-function control apparatus comprising:

an electromagnetic device having an output shaft;

a first gear operably associated with said output shaft and being rotatable about a main pivot axis;

a pivot shaft;

a first intermittent motion mechanism operably driven by said first gear, a second gear mounted for rotation with said mechanism, said second gear being pivotable about said pivot shaft;

a drive shaft;

a third gear operably coupled to said second gear and being pivotable about said drive shaft; and a spring surrounding one of said pivot and drive shafts and being concentrically located within one of said second and third gears, respectively, said one of said pivot and drive shafts being offset to said main pivot axis, said spring having two opposing ends that project from said spring in a direction perpendicular to the longitudinal axis of said one of said pivot and drive shafts, wherein one end secures said spring to said one of said second and third gears and the other end secures said spring to said one of said pivot and drive shafts, respectively.

12. The apparatus of claim 11, wherein said spring comprises a coil spring disposed within a hub of said one of said second and third gears, said spring being fixedly secured at said one end to said one of said second and third gears and at said other end to said one of said pivot and drive shafts.

13. The apparatus of claim 12, wherein said coil spring is disposed over said drive shaft so as to be disposed concentrically with said third gear and said drive shaft.

14. The apparatus of claim 12, wherein said spring is preloaded before being secured to said one of said second and third gears and said one of said pivot and drive shafts.

15. The apparatus of claim 11, further comprising a wiper arm operably driven by said drive shaft.

16. The apparatus of claim 11, further comprising:

a second intermittent motion mechanism operably driven by said first gear; and a third intermittent motion mechanism operably driven by said first gear;

wherein each of said intermittent motion mechanisms can be rotated while the others remain substantially stationary.

* * * * *